(12) United States Patent
Matsunaga et al.

(10) Patent No.: US 12,522,233 B2
(45) Date of Patent: Jan. 13, 2026

(54) VEHICLE CONTROL APPARATUS AND VEHICLE CONTROL METHOD

(71) Applicants: TOYOTA JIDOSHA KABUSHIKI KAISHA, Toyota (JP); DENSO CORPORATION, Kariya (JP)

(72) Inventors: Naoya Matsunaga, Nagoya (JP); Takuya Kaminade, Okazaki (JP); Masaki Ikai, Toyota (JP); Ryo Ishii, Toyota (JP); Masashi Oishi, Owariasahi (JP)

(73) Assignees: TOYOTA JIDOSHA KABUSHIKI KAISHA, Toyota (JP); DENSO CORPORATION

( * ) Notice: Subject to any disclaimer, the term of this patent is extended or adjusted under 35 U.S.C. 154(b) by 26 days.

(21) Appl. No.: 18/782,771

(22) Filed: Jul. 24, 2024

(65) Prior Publication Data
US 2025/0065897 A1    Feb. 27, 2025

(30) Foreign Application Priority Data
Aug. 24, 2023   (JP) ................. 2023-136171

(51) Int. Cl.
*B60W 50/00*     (2006.01)
*B60W 50/08*     (2020.01)
*B60W 50/14*     (2020.01)

(52) U.S. Cl.
CPC .......... *B60W 50/087* (2013.01); *B60W 50/14* (2013.01); *B60W 2540/103* (2013.01); *B60W 2540/106* (2013.01); *B60W 2540/18* (2013.01)

(58) Field of Classification Search
CPC .............. B60W 50/087; B60W 50/14; B60W 2540/103; B60W 2540/106;
(Continued)

(56) References Cited

U.S. PATENT DOCUMENTS 8,280,607 B2 * 10/2012 Gatti ................. B60W 10/06
701/99
11,001,255 B2 * 5/2021 Fukuman .............. B60W 30/09
(Continued)

FOREIGN PATENT DOCUMENTS

JP      2018131069 A    8/2018
JP      6806201 B1     12/2020

*Primary Examiner* — Phutthiwat Wongwian
*Assistant Examiner* — Sherman D Manley
(74) *Attorney, Agent, or Firm* — Hunton Andrews Kurth LLP

(57)          ABSTRACT

An ECU of a vehicle control apparatus determines that an erroneous operation to an accelerator pedal has been performed, when both a prerequisite condition and an additional condition are satisfied. The prerequisite condition: an operation amount of the accelerator pedal becomes greater than a high threshold after an increasing rate of the accelerator pedal operation amount becomes great at a driving range. The additional condition is satisfied when at least one of three conditions (1)-(3) is satisfied. The condition (1): a shift position is at a driving range and a first operation to the accelerator pedal is not performed in a first period before the prerequisite condition becomes satisfied. The condition (2): a magnitude of a steering angle of when prerequisite condition becomes satisfied is great. The condition (3): a second operation to the accelerator pedal is performed at a non-driving range before the prerequisite condition becomes satisfied.

7 Claims, 6 Drawing Sheets

(58) Field of Classification Search
CPC ......... B60W 2540/18; B60W 2540/10; B60W 2540/12; B60W 40/08; B60W 2510/1005; B60W 2520/10; B60W 2552/15; B60K 28/02; B60K 28/066
See application file for complete search history.

(56) References Cited

U.S. PATENT DOCUMENTS

| | | | | |
|---|---|---|---|---|
| 11,511,765 | B2* | 11/2022 | Kaminade | B60W 50/10 |
| 2012/0322616 | A1* | 12/2012 | Fukui | B60W 50/10 |
| | | | | 477/94 |
| 2019/0256095 | A1* | 8/2019 | Takagi | B60W 50/14 |
| 2020/0262446 | A1* | 8/2020 | Mayoshi | B60W 50/10 |
| 2020/0331474 | A1* | 10/2020 | Oda | B60W 10/04 |
| 2021/0039665 | A1* | 2/2021 | Kaminade | B60W 50/10 |
| 2021/0197844 | A1* | 7/2021 | Kaminade | B60W 50/0098 |
| 2021/0213967 | A1* | 7/2021 | Tochigi | B60W 50/12 |
| 2021/0309240 | A1* | 10/2021 | Kim | B60W 50/10 |
| 2022/0161812 | A1* | 5/2022 | Takenaka | B60W 50/12 |
| 2023/0202475 | A1* | 6/2023 | Tsuchiya | B60W 30/146 |
| | | | | 701/93 |
| 2023/0322211 | A1* | 10/2023 | Yoshikawa | B60W 10/04 |
| | | | | 701/99 |

* cited by examiner

VEHICLE CONTROL APPARATUS AND VEHICLE CONTROL METHOD

CROSS-REFERENCE TO RELATED APPLICATION

This application claims priority to Japanese Patent Application No. 2023-136171 filed on Aug. 24, 2023, incorporated herein by reference in its entirety.

TECHNICAL FIELD

The present disclosure relates to a vehicle control apparatus that has a function to determine whether or not an erroneous operation of an accelerator pedal (i.e., a wrong pedal press) has occurred, and a vehicle control method thereof.

BACKGROUND

A conventional apparatus, disclosed in Japanese Patent No. 6806201, determines that the erroneous operation of an accelerator pedal of a vehicle has occurred, when an accelerator pedal operation amount becomes equal to or greater than a predetermined operation amount threshold before a predetermined time elapses from/after a time point at which an operation rate of the accelerator pedal becomes equal to or greater than an operation rate threshold.

It turned out that the above-described conventional apparatus may erroneously determine that a proper operation of the accelerator pedal according to (or based on) a driver's intention is the erroneous (wrong) operation. If this happens, an unnecessary driving force suppression control may be carried out and/or an unnecessary alert/warning may be issued, causing a feeling of strangeness of the driver.

SUMMARY

The present disclosure is made to cope with the problem described above. Namely, one of objectives of the present disclosure is to provide a vehicle control apparatus and method that can decrease a frequency of determining that the proper operation of the accelerator pedal according to the driver's intention is the erroneous operation.

One of embodiments of the vehicle control apparatus (hereinafter, referred to as a "present disclosure apparatus") according to the present disclosure comprises a controller (10). The controller (10) determines that the erroneous operation to the accelerator pedal of the vehicle is performed (refer to S260), when the controller determines that:

a prerequisite condition (including a first condition and a second condition) is satisfied, wherein the prerequisite condition is a condition to be satisfied when a shift position (Sp) of the vehicle is at a driving range (D range, R range, or the like), and the accelerator pedal operation amount (AP) becomes equal to or greater than a predetermined high operation amount threshold (APth3) during a period from a first time point (t1) to a second time point (t2), the first time point (t1) being a time point at which an increasing rate (dAP) of the accelerator pedal operation amount (AP) becomes equal to or greater than a predetermined operation rate threshold (dApth), and the second time point (t2) being a time point at which an elapsed time (Ta) from the first time point (t1) reaches a first time threshold (Tath); and at least one of a non-acceleration-operation while driving condition (an eighth condition), a steering angle condition (a ninth condition), and an acceleration-operation while non-driving condition (a tenth condition) is satisfied (refer to S255: Yes, S410: Yes, S510: Yes), wherein, the non-acceleration-operation while driving condition (the eight condition) is a condition to be satisfied when the shift position is at the driving range and a predetermined first operation to the accelerator pedal is not performed in a predetermined first period (Ph) prior to a time point (t2) at which the prerequisite condition becomes satisfied;

the steering angle condition (the ninth condition) is a condition to be satisfied when a magnitude ($|\theta|$) of a steering angle ($\theta$) at the time point (t2) at which (or of when) the prerequisite condition becomes satisfied is equal to or greater than a predetermined steering angle threshold ($\theta$th); and the acceleration-operation while non-driving condition (the tenth condition) is a condition to be satisfied when the prerequisite condition becomes satisfied prior to a time point at which a predetermined history effective time elapses since an accelerator operation time point while non-driving, the accelerator operation time point while non-driving being a time point at which a predetermined second operation to the accelerator pedal is performed while the shift position is at a non-driving range (P range or N range).

As a result of analyzing data, the inventors of the present disclosure have acquired a finding that the erroneous operation of the accelerator pedal frequently/actually occurs, when the above-described prerequisite condition is satisfied and when at least one of the above-described non-acceleration-operation while driving condition (the eight condition), the above-described steering angle condition (the ninth condition), and the above-described acceleration-operation while non-driving condition (the tenth condition) is satisfied. In other words, even when the above-described prerequisite condition is satisfied, it is unlikely that the erroneous operation of the accelerator pedal has been occurring, if any one of the non-acceleration-operation while driving condition, the steering angle condition, and the acceleration-operation while non-driving condition is not satisfied. Therefore, the above-described embodiment can decrease a possibility that an accelerator pedal operation according to the driver's intention is mistakenly determined to be the erroneous/wrong operation of the accelerator pedal. As a result, the above-described embodiment can decrease a possibility that the unnecessary alert and/or the unnecessary drive power suppression control are/is performed.

Notably, in the above description, in order to facilitate understanding of the present disclosure, the constituent elements corresponding to those of embodiments which will be described later are accompanied by parenthesized symbols and/or names which are used in the embodiments; however, the constituent elements of the disclosure are not limited to those in the embodiments defined by the symbols and/or the names. The present disclosure covers a vehicle control method, and a program thereof.

DESCRIPTION OF THE EMBODIMENTS

First Embodiment

Figure 1:
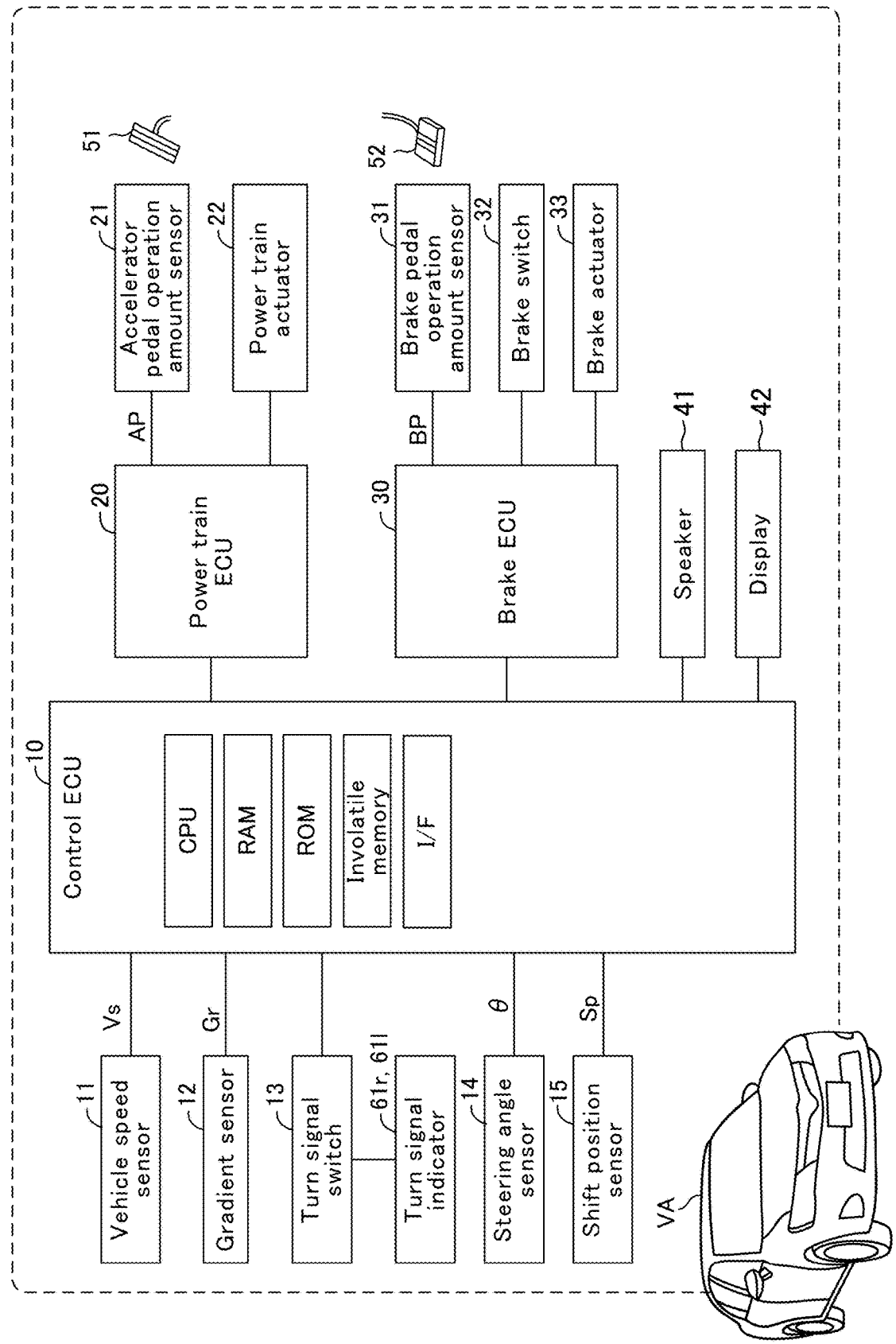
FIG. 1 is a schematic configuration diagram of a vehicle control apparatus (first apparatus) according to a first embodiment of the present disclosure.

A vehicle control apparatus (hereinafter, referred to as a "first apparatus") according to a first embodiment of the present disclosure comprises component elements shown in FIG. 1, and is applied to or is mounted on a vehicle VA. Vehicle control apparatuses according to the other embodiments of the present disclosure, which will be described later, comprise the same configuration as the first apparatus.

In the present specification, an "ECU" means an Electronic Control Unit that may be referred to as a controller. The ECU comprises a microcomputer as a main part including a CPU (processor) and memories including a ROM and a RAM. The component elements including a plurality of ECUs shown in FIG. 1 are connected to each other through a Controller Area Network (CAN) so as to be able to exchange information with each other. Some of or all of ECUs shown in FIG. 1 may be integrated into a single ECU. The microcomputer includes the CPU, the RAM, the ROM, and an interface, to realize various functions described later by executing instructions (programs, routines) stored in the ROM.

The control ECU 10 is connected with "sensors and switches" listed below so as to receive their detected signals or output signals.

A vehicle speed sensor 11 outputs a signal indicative of a traveling speed (i.e., vehicle speed Vs) of the vehicle VA.

A gradient sensor 12 outputs a signal indicative of a gradient Gr in a vehicle longitudinal (front-rear) direction of a road surface on which the vehicle is traveling. The gradient Gr becomes a positive value (Gr>0) when the vehicle VA drives/runs uphill.

A turn signal switch 13 outputs a signal causing a right turn signal indicator 61r to be an ON state (blinking state) when a turn signal lever operated by the driver is at a first position, and a signal causing a left turn signal indicator 61l to be an ON state (blinking state) when the turn signal lever is at a second position.

A steering angle sensor 13 outputs a signal indicative of a steering angle θ that is a rotation angle of a steering wheel of the vehicle VA.

A shift position sensor 15 outputs a signal indicative of a shift position Sp of a power transmission device such as a transmission of the vehicle VA. The shift position Sp includes a driving position (or a range) for driving the vehicle VA (e.g., a forward range (D) and a reverse range (R)) and a non-driving position for maintaining the vehicle VA in a non-driving state (e.g., a parking range (P) and a neutral range (N)).

A power train ECU 20 is connected with an accelerator pedal operation sensor 21 that outputs a signal indicative of an operation amount (i.e., accelerator opening degree ratio [%]) AP of an accelerator pedal 51 that is an acceleration operation element operated by the driver to accelerate the vehicle VA. The power train ECU 20 obtains the accelerator operation amount AP from the accelerator pedal operation sensor 21.

The power train ECU 20 is connected with a power train actuator 22 and is able to drive the actuator 22. The actuator 22 can vary a torque which a driving device (driving source) of the vehicle VA generates. The torque which the driving device generates is transmitted to driving wheels through the power transmission device. Therefore, the power train ECU 20 can control a driving force applied to the vehicle VA.

For example, when the driving device of the vehicle VA is a gasoline fuel internal combustion engine, the actuator 22 may be a throttle valve actuator that varies an opening degree of a throttle valve. The vehicle VA may be an electric vehicle. In such a case, the actuator 22 may be an inverter capable of varying a torque of an electric motor. The vehicle VA may be a hybrid vehicle. In such a case, the actuator 22 may include the inverter for the electric motor and the throttle valve actuator of the internal combustion engine.

A brake ECU 30 is connected with a brake pedal operation amount sensor 31 that outputs a signal indicative of an operation amount BP of a brake pedal 52 and a brake switch 32 that outputs an off-signal when the brake pedal 52 is not operated and an on-signal when the brake pedal 52 is operated. The brake ECU 30 obtains the signals from them. In addition, the brake ECU 30 is connected with a brake actuator 33. The brake ECU 30 controls a frictional brake device provided to each wheel of the vehicle VA so as to vary a frictional brake force applied to the vehicle VA by driving the actuator 33. Namely, the brake ECU 30 can control a brake force applied to the vehicle VA.

Furthermore, the control ECU 10 is connected with a speaker 41 and a display 42.

(Operation)

As a result of analyzing data, the inventors of the present disclosure have acquired a finding that the erroneous operation of the accelerator pedal frequently occurs when the driver suddenly start to press the accelerator pedal while he/she has not been pressing the accelerator pedal at all (i.e., a creeping state). The reason for this can be inferred as follows. When the shift position Sp is at the driving rage and the driver presses the accelerator pedal, the vehicle VA is accelerated, and thus, in this case, the driver recognizes that he/she is operating the accelerator pedal. Accordingly, it is inferred that the sudden press of the accelerator pedal in a case where the shift position Sp is at the driving rage and the driver continue pressing the accelerator pedal is mostly an intentional accelerator pedal operation. In view of this, the first apparatus is configured to determine that the accelerator pedal is erroneously/wrongly operated if an eighth condition described later is determined to become satisfied in addition to "conditions (the first to the seventh conditions, or at least the first and second conditions) described in the Japanese Patent No. 6806201" that are to be satisfied in order to determine that the accelerator pedal is erroneously/wrongly operated.

(Specific Operation)

The CPU of the vehicle control ECU 10 (hereinafter, simply referred to as a "CPU") executes a routine shown in FIG. 2, every time a predetermined time elapses. Hereinafter, "step" is expressed as "S".

Figure 2:
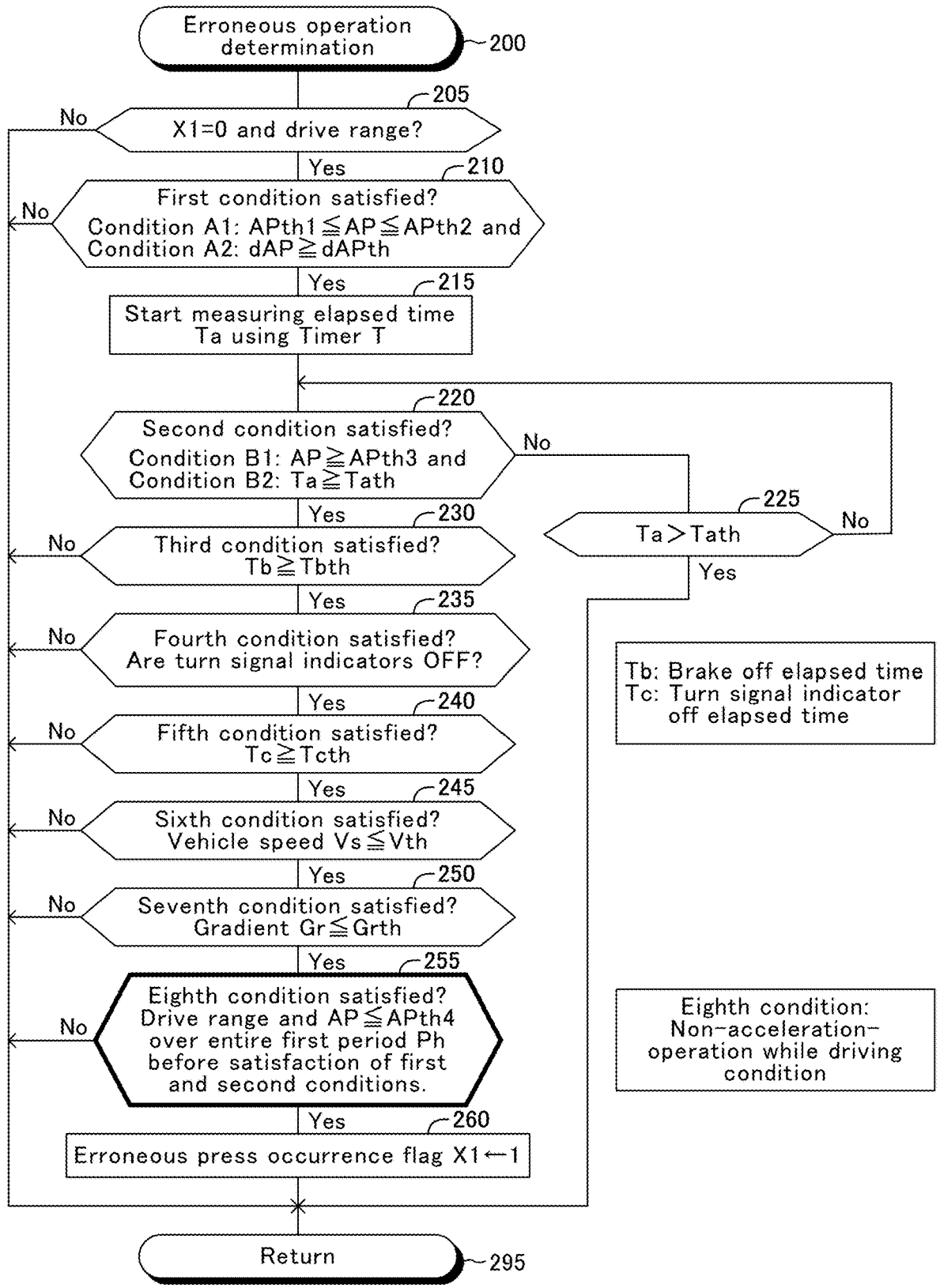
FIG. 2 shows a routine executed by a control ECU of the first apparatus.

When an appropriate time point comes, the CPU starts processing from S200 in FIG. 2, and proceeds to S205. At S205, the CPU determines whether or not the shift position Sp is at the driving range and a value of an erroneous press occurrence flag X1 is "0". When the shift position Sp is at the driving range and the value of the erroneous press occurrence flag X1 is "0", the CPU proceeds to S210 and determines whether or not a first condition described below is satisfied. More specifically, the CPU determines that the first condition is satisfied, when both of a condition A1 and a condition A2, described below, are satisfied. It should be noted that the CPU may determine that the first condition is satisfied, when at least the condition A2 is satisfied.

(First Condition)

Condition A1: The accelerator pedal operation amount AP is equal to or larger than a first operation amount threshold APth1, and is smaller than a second operation amount threshold APth2. It should be noted that the condition A1 is a condition to be satisfied at least when the accelerator pedal operation amount AP is equal to or greater than the first operation amount threshold APth1.

Condition A2: An accelerator pedal operation rate dAP (i.e., an increasing amount of the accelerator pedal operation amount AP per unit time) is equal to or greater than an operation rate threshold dAPth.

When the first condition is satisfied, the CPU proceeds to S215 from S210 and starts measuring an elapsed time Ta using a timer T. In other words, a value of the timer T indicates the elapsed time (length) Ta from a first time point at which the first condition becomes satisfied. Subsequently, at S220, the CPU determines whether or not a second condition is satisfied. The second condition is satisfied, when both of a condition B1 and a condition B2, described below, are satisfied.

(Second Condition)

Condition B1: The accelerator pedal operation amount AP becomes equal to or greater than a third operation amount threshold APth3. The third operation amount threshold APth3 is a value (for example, accelerator opening degree 90[%]) that is greater than the second operation amount threshold APth2 and is equal to or greater than a lower limit value (for example, accelerator opening degree 80[%]) in the high opening degree region. The third operation amount threshold APth3 is sometimes referred to as a high operation amount threshold.

Condition B2: The elapsed time Ta at a time point at which (of when) the condition B1 becomes satisfied is equal to or shorter than a first time threshold Tath (for example, 0.5 [sec.]). Therefore, the second condition is satisfied, when the condition B1 becomes satisfied before the elapsed time Ta from the first time point at which the first condition becomes satisfied reaches the first time threshold Tath.

In this manner, the second condition is a condition that can be satisfied only if the first condition has been satisfied. The second condition together with the first condition is referred as a prerequisite condition (or a precondition).

If the second condition is not satisfied, the CPU proceeds to S225 from S220 and determines whether or not the elapsed time Ta is longer than the first time threshold Tath. When the elapsed time Ta is equal to or shorter than the first time threshold Tath, the CPU returns to S220 from S225. Whereas, when the elapsed time Ta becomes longer than the first time threshold Tath, the CPU directly proceeds to step S295 from S225 to terminate the present routine tentatively.

When the second condition becomes satisfied, the CPU proceeds from S220 to steps from S230 to S250 in order, and determines whether or not each of conditions from a third condition to a seventh condition is satisfied.

(Third Condition)

An elapsed time (length) Tb from a time point at which the brake switch 32 starts outputting the off-signal is equal to or longer than a second time threshold Tbth (S230).

(Fourth Condition)

A state of the turn signal switch 13 indicates a state in which both of the right turn signal indicator 61r and the left turn signal indicator 61l are in the off state (S235).

(Fifth Condition)

An elapsed time Tc is equal to or longer than a third time threshold Tcth (S240). The elapsed time Tc is a time length of a state in which both of the right turn signal indicator 61r and the left turn signal indicator 61l continue being in the off state from a time point (hereinafter, simply referred to as an "off time point") at which one of the right turn signal indicator 61r and the left turn signal indicator 61l turns to the off state from the on state.

(Sixth Condition)

The vehicle speed Vs is equal to or lower than a speed threshold Vth representing a low speed (S245).

(Seventh Condition)

The gradient Gr is equal to or smaller than a gradient threshold Grth that is positive (S250). Namely, the vehicle VA is not running uphill.

When all of the conditions from the third to seventh conditions, the CPU makes a "Yes" determination at each of those steps to proceed to S255, and determines whether or not an eighth condition described below is satisfied.

(Eighth Condition)

The shift position Sp is at the driving range and the accelerator pedal operation amount Ap is equal to or smaller than a fourth operation amount threshold APth4 over a predetermined entire first period Ph prior to a time point (t2) at which the second condition becomes satisfied in a case where the first and the second conditions are both satisfied. The first period Ph is a period from a time point t11 to a time point t22 (refer to FIGS. 3A and 3B). The time point t11 is a first time length T1 (e.g., 9.5 [s]) before the time point (t2) at which the second condition becomes satisfied. The time point t22 is a second time length T2 (e.g., 0.5 [s]) before the time point (t2) at which the second condition becomes satisfied. The second time length T2 is shorter than the first time length T1, and is equal to or longer than the first time threshold Tath. An accelerator pedal operation that causes the accelerator pedal operation amount AP to become greater than the fourth operation amount threshold APth4 may sometimes be referred to as a "first operation".

In this manner, the eighth condition becomes satisfied, when there is no history of the accelerator pedal operation under the state in which the shift position is at the driving range/position (i.e., when the predetermined first operation onto the accelerator pedal has not been performed while the shift position is at the driving range) prior to the time point at which the sudden accelerator pedal press that causes the first and second conditions to be satisfied is made (i.e., prior to the time point at which it is inferred that the operation of the erroneous accelerator pedal press may have been carried out). The fourth operation threshold APth4 may sometimes be referred to as an operation determination threshold while driving, and the eighth condition may sometimes be referred to as a non-acceleration-operation while driving condition.

Figure 3A:
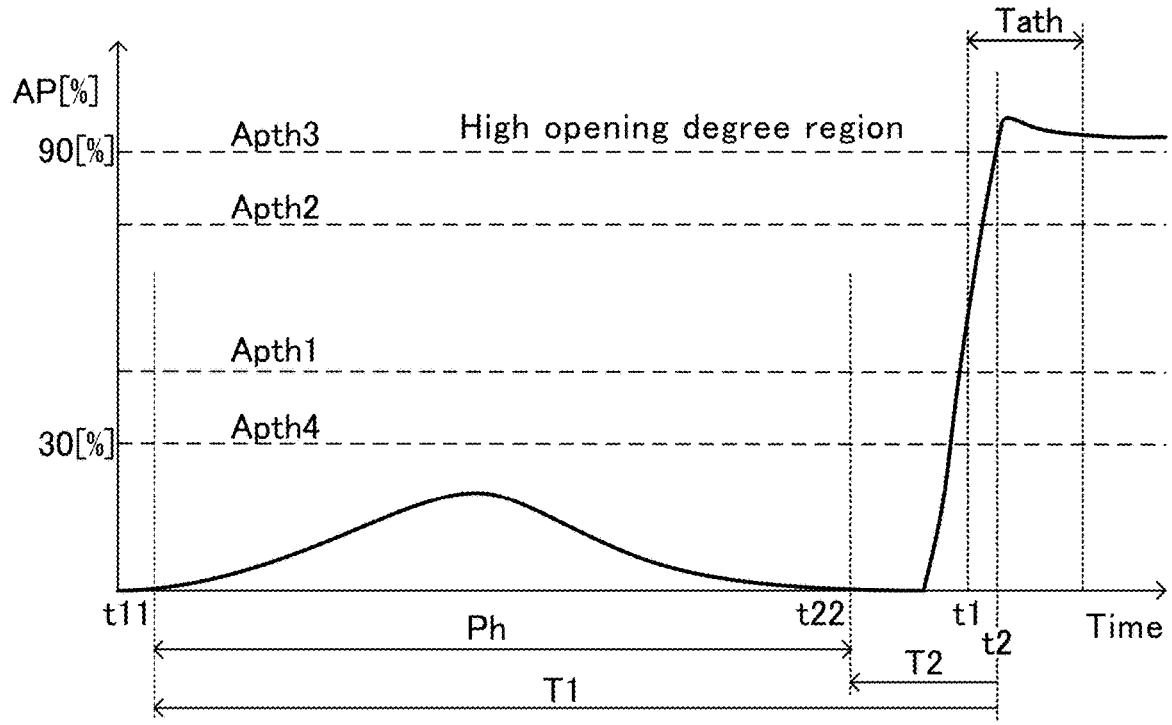
FIG. 3A shows timing charts for describing operations of the first apparatus.
Figure 3B:
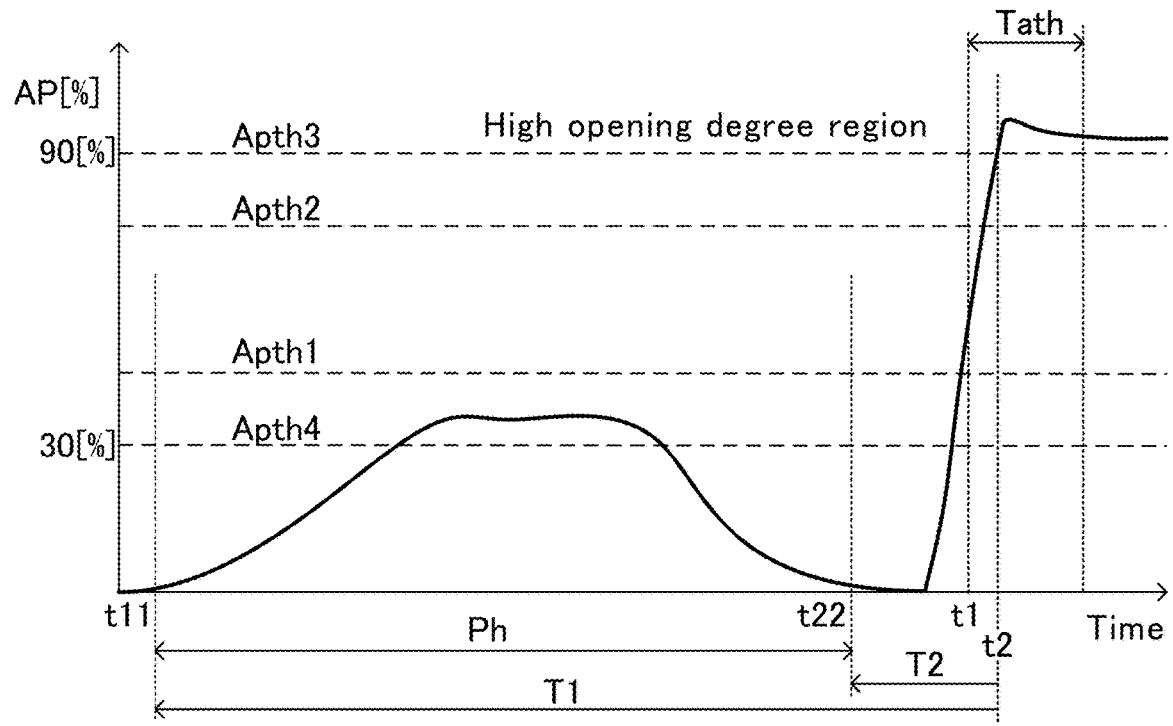
FIG. 3B shows timing charts for describing operations of the first apparatus.

FIG. 3A shows an example where the eighth condition is satisfied, and FIG. 3B shows an example where the eighth condition is not satisfied.

When the eighth condition is satisfied, the CPU proceeds to S260 from S255, and sets the value of the erroneous press occurrence flag X1 to "1". Namely, the CPU determines that erroneous operation of the accelerator pedal (wrong pedal press operation) has occurred. This causes the acceleration suppression control and the alert, described later, to be carried out. Thereafter, the CPU proceeds to S295 to terminates the present routine tentatively.

It should be noted that, when the CPU proceeds to S205, the CPU directly proceeds to S295 from S205 if the shift position Sp is not at the driving range or if the value of the erroneous press occurrence flag X1 is "1". In addition, when the first condition is not satisfied, the CPU directly proceeds to S295 from S210. Furthermore, when any one of conditions from the third to eighth condition is not satisfied, the CPU directly proceeds to S295 from one of the corresponding steps including S230 to S255.

(Operation when the Wrong Pedal Press is not Occurred)

When the value of the erroneous press occurrence flag X1 is "0", the CPU controls the drive force through the power train ECU 20 in such a manner that an actual acceleration of the vehicle VA becomes equal to a "required acceleration Gap determined based on the accelerator pedal operation amount AP and the vehicle speed Vs". The required acceleration Gap becomes greater as the accelerator pedal operation amount AP becomes greater. The required acceleration Gap becomes smaller as the vehicle speed Vs becomes higher. This control is referred to as an ordinal drive force control.

(Operation when the Wrong Pedal Press is Occurred)

When the value of the erroneous press occurrence flag X1 is "1", the CPU obtains "an upper limit acceleration Glim in accordance with the vehicle speed Vs". The upper limit acceleration Glim is maintained/set at a constant acceleration G1 when the vehicle speed Vs is between "0" and "Vs1". The upper limit acceleration Glim becomes smaller as the vehicle speed Vs becomes higher from "Vs1", and is set at "0" when the vehicle speed Vs is equal to or higher than "Vs2 (>Vs1)". The CPU sets a target acceleration Gtgt to the smaller of the required acceleration Gap and the upper limit acceleration Glim. The CPU controls the drive force through the power train ECU 20 in such a manner that the actual acceleration of the vehicle VA becomes equal to the target acceleration Gtgt when the value of the erroneous press occurrence flag X1 is "1". This control is referred to as a drive power suppression control. It should be noted that the CPU may set the target acceleration in the drive power suppression control to a value obtained by multiplying the required acceleration Gap by a coefficient α that is between 0 and 1.

When the value of the erroneous press occurrence flag X1 is "1", the CPU further issues an alert to the driver. More specifically, when the value of the erroneous press occurrence flag X1 is "1", the CPU causes the speaker 41 to generate "an alert sound to call driver's attention", and causes the display 42 to display a message that the accelerator pedal 51 is being pressed and an alert mark (e.g., warning lamp). It should be noted that the CPU may perform only one of the above-described drive power suppression control and the above-described alert, when the value of the erroneous press occurrence flag X1 is "1". When the accelerator pedal operation amount AP becomes equal to or smaller than a cancel threshold or "0", the CPU changes the value of the erroneous press occurrence flag X1 to "0".

Second Embodiment

Figure 4:
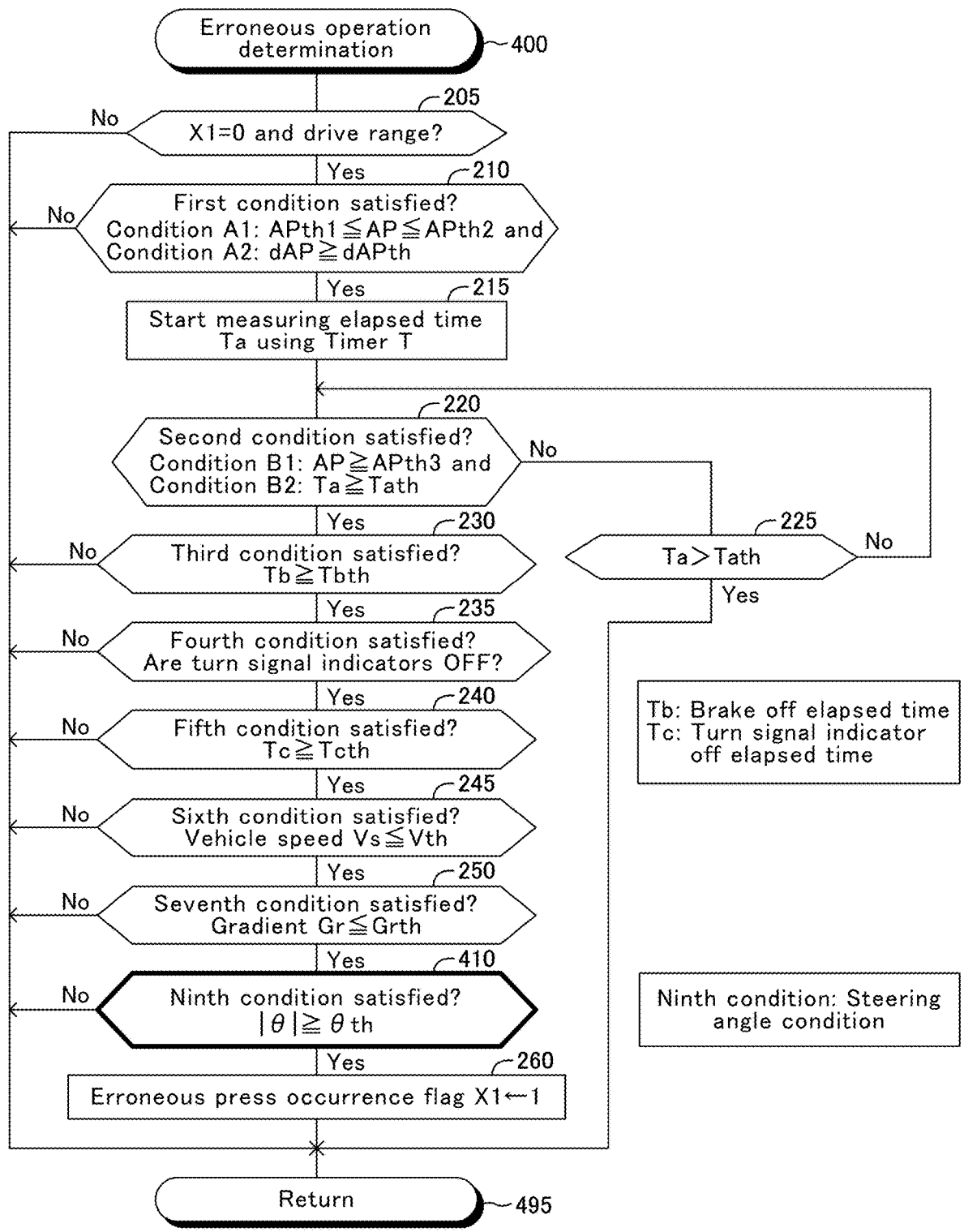
FIG. 4 shows a routine executed by a control ECU of a vehicle control apparatus (second apparatus) according to a second embodiment of the present disclosure.

A vehicle control apparatus (hereinafter, referred to as a "second apparatus") according to a second embodiment of the present disclosure is different from the first apparatus only in that its CPU executes a routine shown in FIG. 4 in place of FIG. 2. In the routine shown in FIG. 4, S255 shown in FIG. 2 is replaced with S410.

As a result of analyzing data, the inventors of the present disclosure have acquired a finding that the erroneous operation of the accelerator pedal frequently occurs when the driver is trying a front-end parking in a parking space, for example, in a store parking area or a facility, while he/she is steering the steering wheel greatly. In view of this, the second apparatus is configured to determine that the accelerator pedal has been erroneously operated (the erroneous operation of the accelerator pedal has been occurring) when a ninth condition in place of the eighth condition is determined to become satisfied.

More specifically, when the CPU makes a "Yes" determination at S250 in FIG. 4 to proceed to S410, and determines whether or not the ninth condition described below is satisfied.

(Ninth Condition)

A magnitude ($|\theta|$) of the steering angle $\theta$ is equal to or greater than a steering angle threshold $\theta$th (e.g., 270 [deg]) that is positive. The ninth condition is sometimes referred to as a steering angle condition.

When the ninth condition is satisfied, the CPU determines that the erroneous operation of the accelerator pedal has been occurring, and thus, proceeds to S260 from S410. Thereafter, the CPU proceeds to S495. Whereas, when the ninth condition is not satisfied, the CPU directly proceeds to S495 from S410.

Third Embodiment

Figure 5:
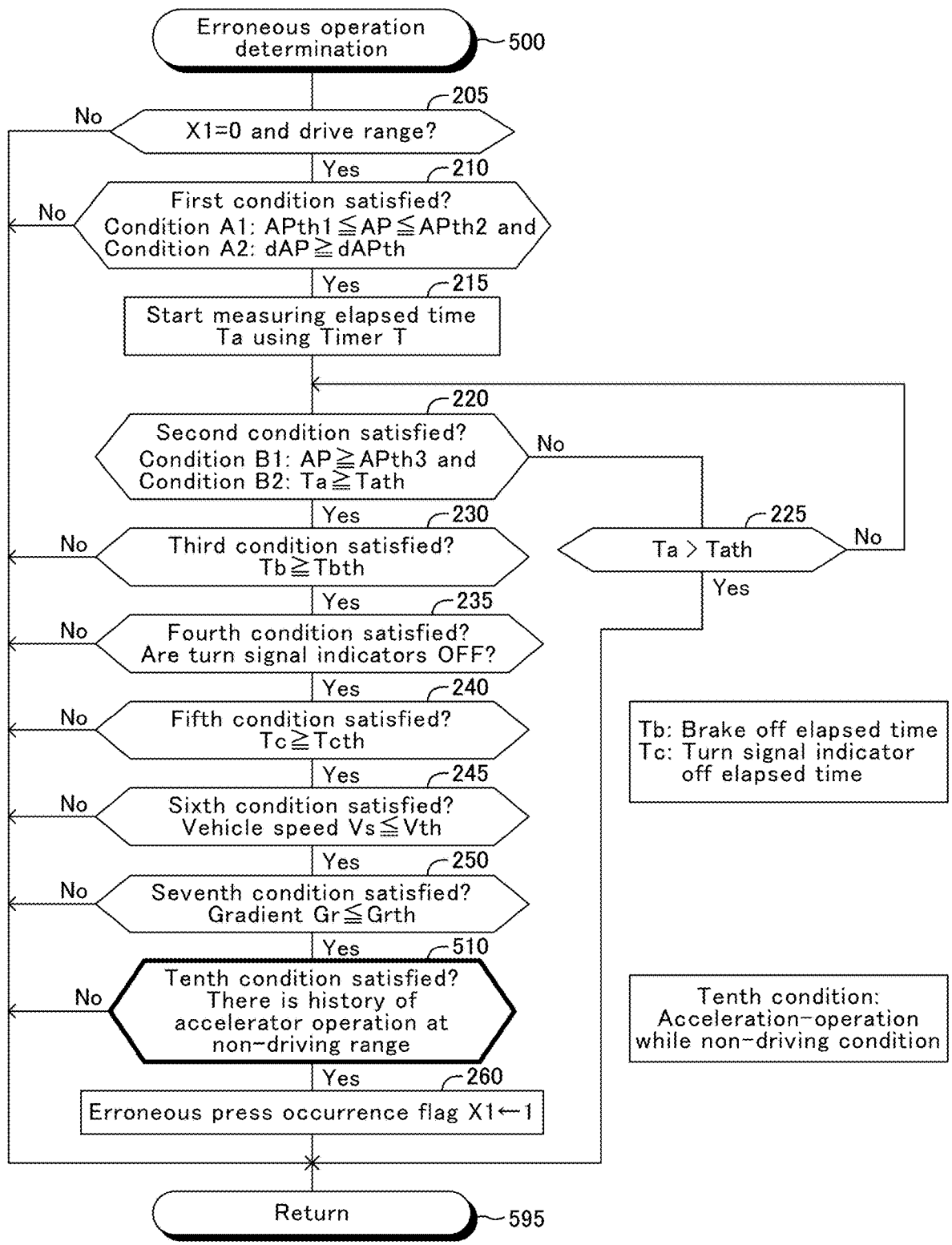
FIG. 5 shows a routine executed by a control ECU of a vehicle control apparatus (third apparatus) according to a third embodiment of the present disclosure.

A vehicle control apparatus (hereinafter, referred to as a "third apparatus") according to a third embodiment of the present disclosure is different from the first apparatus only in that its CPU executes a routine shown in FIG. 5 in place of FIG. 2. In the routine shown in FIG. 5, S255 shown in FIG. 2 is replaced with S510.

As a result of analyzing data, the inventors of the present disclosure have acquired a finding that the driver frequently performs "a specific operation that he/she presses the accelerator pedal for more than a predetermined time (length) while the shift position Sp is at the non-driving range" before the erroneous operation of the accelerator pedal occurs. The reason for this is inferred as follows. An "erroneous recognition of pedals (between the brake pedal 52 and the accelerator pedal 51)" sometimes occurs when the driver erroneously presses the accelerator pedal 51 while he/she intends to press the brake pedal 52 in order for him/her to change the shift position Sp from the P range (parking range) which is the non-driving range to the D range (forwarding range) which is the driving range. While the erroneous recognition of pedals is occurring, the driver happens to press the brake pedal 52 by accident, and therefore, the shift range Sp is changed to the driving range. And immediately after that, the erroneous operation of the accelerator pedal 51 occurs. In view of this, the third apparatus is configured to determine that the accelerator pedal has been erroneously operated (the erroneous operation of the accelerator pedal has been occurring) when a tenth condition in place of the eighth condition is determined to become satisfied.

More specifically, when the CPU makes a "Yes" determination at S250 in FIG. 5 to proceed to S510, and determines whether or not the tenth condition described below is satisfied.

(Tenth Condition)

A present time point (namely, the time point at which at least one of the first condition and the second condition becomes satisfied) is within a history effective time TR (e.g., 10 [s]) from a time point at which a "time (length) of a state in which the shift position Sp is at the non-driving range and the accelerator pedal operation AP is equal to or greater than a fifth operation amount threshold APth5" was equal to or longer than a continuous time threshold T5th.

An accelerator pedal operation that causes "the time (length) of the state in which accelerator pedal operation AP is equal to or greater than the fifth operation amount threshold APth5" to be equal to or longer than the continuous time threshold T5th may sometimes be referred to as a "second operation". In this manner, the tenth condition is satisfied when there is a history of the accelerator pedal operation while the shift position Sp is at the non-driving range. The fifth operation amount threshold APth5 may sometimes be referred to as an operation determination threshold while non-driving. The continuous time threshold T5th may sometimes be referred to as an acceleration operation history time threshold. In addition, the tenth condition may sometimes be referred to as an acceleration-operation while non-driving condition.

When the tenth condition is satisfied, the CPU determines that the erroneous operation of the accelerator pedal has been occurring, and thus, proceeds to S260 from S510. Thereafter, the CPU proceeds to S595. Whereas, when the tenth condition is not satisfied, the CPU directly proceeds to S595 from S510.

Figure 6:
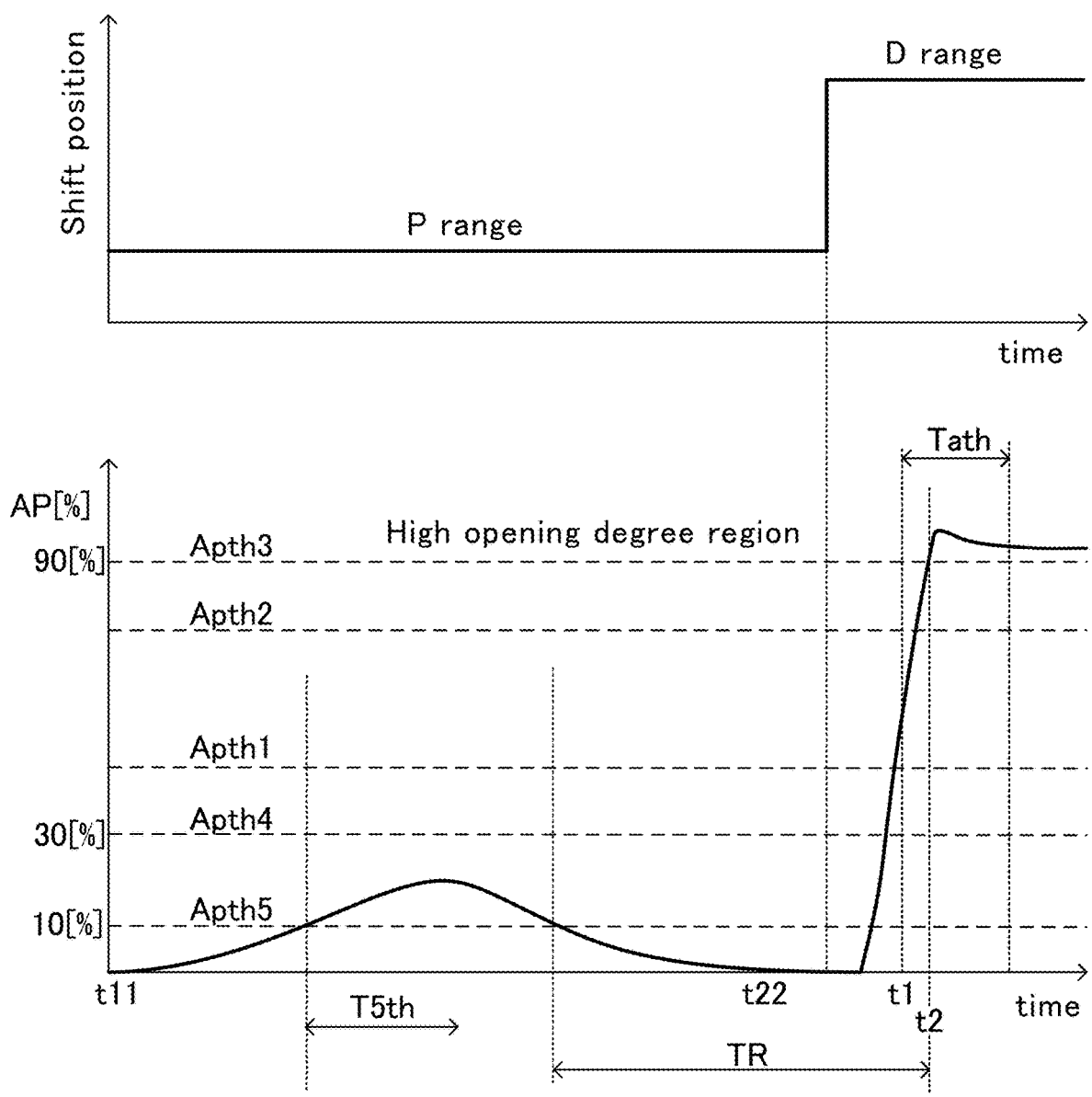
FIG. 6 shows a timing chart for describing operations of the third apparatus.

FIG. 6 shows an example where the tenth condition is satisfied.

As has been described, each of the embodiments according to the present disclosure can decrease the possibility of determining that the proper accelerator pedal operation that is not the erroneous accelerator pedal operation is the erroneous/wrong accelerator pedal operation. It should be noted that the present disclosure should not be limited to the embodiments and modifications described above, and various modified examples can be adopted within the scope of the present disclosure. For example, in each of the embodiments, the satisfaction of each of the conditions from the third to seventh condition is not indispensable for the erroneous accelerator pedal operation to be determined to be occurring. Namely, some of or all of steps from S230 to S250 can be omitted. Furthermore, each of the embodiments according to the present disclosure can be applied to an autonomous vehicle whose driving mode is changed from an autonomous driving mode to a driving mode where the driver drives the vehicle.

What is claimed is:

1. A vehicle control apparatus comprising a controller configured to determine that an erroneous operation to an accelerator pedal of a vehicle is performed, when the controller determines that:
    a prerequisite condition is satisfied, wherein said prerequisite condition is a condition to be satisfied when a shift position of said vehicle is at a driving range, and an accelerator pedal operation amount becomes equal to or greater than a predetermined high operation amount threshold during a period from a first time point to a second time point, said first time point being a time point at which an increasing rate of said accelerator pedal operation amount becomes equal to or greater than a predetermined operation rate threshold, and said second time point being a time point at which an elapsed time from said first time point reaches a first time threshold; and
    at least one of a non-acceleration-operation while driving condition, a steering angle condition, and an acceleration-operation while non-driving condition is satisfied, wherein
    said non-acceleration-operation while driving condition is a condition to be satisfied when said shift position is at said driving range and a predetermined first operation to said accelerator pedal is not performed in a predetermined first period prior to a time point at which said prerequisite condition becomes satisfied;
    said steering angle condition is a condition to be satisfied when a magnitude of a steering angle at said time point at which said prerequisite condition becomes satisfied is equal to or greater than a predetermined steering angle threshold; and
    said acceleration-operation while non-driving condition is a condition to be satisfied when said prerequisite condition becomes satisfied prior to a time point at which a predetermined history effective time elapses since an accelerator operation time point while non-driving, said accelerator operation time point while non-driving being a time point at which a predetermined second operation to said accelerator pedal is performed while said shift position is at a non-driving range.

2. The vehicle control apparatus according to claim 1, wherein,
    said controller is configured to determine that said first operation to said accelerator pedal is not performed, when said accelerator pedal operation amount is smaller than a predetermined operation determination threshold while driving over said entire first period.

3. The vehicle control apparatus according to claim 1, wherein,
    said controller is configured to determine that said second operation to said accelerator pedal is performed, when a state in which said shift position is at said driving range and said accelerator pedal operation amount is equal to or greater than a predetermined operation determination threshold while non-driving continues for a predetermined acceleration operation history time threshold or longer.

4. The vehicle control apparatus according to claim 1, wherein,
    said controller is configured to perform, when said controller determines that said erroneous operation has been occurring, at least one of an alert and a drive force suppression control to decrease a drive force of said vehicle as compared to a case where said controller determines that said erroneous operation has not been occurring.

5. The vehicle control apparatus according to claim 2, wherein,
    said controller is configured to perform, when said controller determines that said erroneous operation has been occurring, at least one of an alert and a drive force suppression control to decrease a drive force of said vehicle as compared to a case where said controller determines that said erroneous operation has not been occurring.

6. The vehicle control apparatus according to claim 3, wherein,
    said controller is configured to perform, when said controller determines that said erroneous operation has been occurring, at least one of an alert and a drive force suppression control to decrease a drive force of said vehicle as compared to a case where said controller determines that said erroneous operation has not been occurring.

7. A vehicle control method comprising:

a step of determining whether or not a prerequisite condition is satisfied, wherein said prerequisite condition is a condition to be satisfied when a shift position of a vehicle is at a driving range, and an accelerator pedal operation amount becomes equal to or greater than a predetermined high operation amount threshold in a period from a first time point to a second time point, said first time point being a time point at which an increasing rate of said accelerator pedal operation amount becomes equal to or greater than a predetermined operation rate threshold, and said second time point being a time point at which an elapsed time from said first time point reaches a first time threshold;

a step of determining whether or not an additional condition is satisfied, said additional condition including at least one of a non-acceleration-operation while driving condition, a steering angle condition, and an acceleration-operation while non-driving condition, wherein, said non-acceleration-operation while driving condition is a condition to be satisfied when said shift position is at said driving range and a predetermined first operation to said accelerator pedal is not performed in a predetermined first period prior to a time point at which said prerequisite condition becomes satisfied;

said steering angle condition is a condition to be satisfied when a magnitude of a steering angle at said time point at which said prerequisite condition becomes satisfied is equal to or greater than a predetermined steering angle threshold; and said acceleration-operation while non-driving condition is a condition to be satisfied when said prerequisite condition becomes satisfied prior to a time point at which a predetermined history effective time elapses since an accelerator operation time point while non-driving, said accelerator operation time point while non-driving being a time point at which a predetermined second operation to said accelerator pedal is performed while said shift position is at a non-driving range; and a step of performing, when determining that said erroneous operation to said accelerator pedal has been performed in a case where both of said prerequisite condition and said additional condition are determined to be satisfied, at least one of an alert and a drive force suppression control to decrease a drive force of said vehicle as compared to a case where it is not determined that said erroneous operation has been performed.

* * * * *